United States Patent [19]

Amano et al.

[11] Patent Number: 5,130,996
[45] Date of Patent: Jul. 14, 1992

[54] SOLID-STATE LASER DEVICE CAPABLE OF GENERATING A HARMONIC LASER BEAM AT A HIGH CONVERSION EFFICIENCY

[75] Inventors: Sho Amano; Seiichi Yokoyama, both of Tokyo, Japan

[73] Assignee: Hoya Corporation, Tokyo, Japan

[21] Appl. No.: 620,135

[22] Filed: Nov. 30, 1990

[51] Int. Cl.$^5$ .................................................. H01S 3/10
[52] U.S. Cl. ........................................ 372/21; 372/22; 372/41; 372/71; 372/75; 359/326; 359/328
[58] Field of Search ................. 372/21, 22, 41, 75, 372/71; 359/326, 328

[56] References Cited

U.S. PATENT DOCUMENTS

| | | | |
|---|---|---|---|
| 4,731,787 | 3/1988 | Fan et al. | 372/21 |
| 4,951,294 | 8/1990 | Basu et al. | 372/21 |

*Primary Examiner*—Georgia Y. Epps
*Attorney, Agent, or Firm*—Ladas & Parry

[57] ABSTRACT

In a solid-state laser device comprising, as a solid-state laser medium, a nonlinear optical crystal, such as $Nd_xY_{1-x}Al_3(BO_3)_4$, which generates a primary laser beam of a fundamental wavelength and which can convert the primary laser beam into a subsidiary laser beam of a harmonic wavelength, a pair of optical elements is brought into contact with both ends of the solid-state laser medium to form a resonator for the primary laser beam. The optical elements may be composed of optical thin films or reflectors attached to the ends of the medium. At least one of the ends of the medium has a spherical surface convex outwards of the medium so as to reflect the primary laser beam into the medium.

8 Claims, 1 Drawing Sheet

SOLID-STATE LASER DEVICE CAPABLE OF GENERATING A HARMONIC LASER BEAM AT A HIGH CONVERSION EFFICIENCY

BACKGROUND OF THE INVENTION

This invention relates to a solid-state laser device which is capable of converting a fundamental wavelength into a harmonic wavelength to generate, as an output laser beam, a laser beam having the harmonic wavelength.

A conventional solid-state laser device of the type described has been proposed in an article which is contributed by Lu Baosheng et al to Chinese Physics Letters Vol. 3, No. 9, pages 413–416 (1986) and which is entitled "Excited Emission and Self-Frequency-Doubling Effect of $Nd_xY_{1-x}Al_3(BO_3)_4$ Crystal". More specifically, the solid-state laser device comprises, as a solid-state laser medium, a nonlinear optical crystal which is represented by $Nd_xY_{1-x}Al_3(BO_3)_4$ and which thus includes Nd. Inasmuch as Nd is operable as a laser activator, the above-mentioned nonlinear optical crystal is capable of emitting a primary laser beam which has a fundamental wavelength determined by Nd when the nonlinear optical crystal is excited or pumped by an excitation beam. The excitation beam may be referred to as a pumping beam. The primary laser beam will be called a fundamental laser beam. In addition, the article reports that wavelength conversion takes place within the nonlinear optical crystal so as to partially convert the primary laser beam of the fundamental wavelength into a subsidiary laser beam of a harmonic wavelength which is derived from the nonlinear optical crystal and that the nonlinear optical crystal is capable of emitting the subsidiary laser beam of the harmonic wavelength. The subsidiary laser beam may be referred to as a harmonic laser beam. Practically, when x is smaller than 0.2, the fundamental wavelength of 1.064 micron meters ($\mu$m) is stably converted into a second harmonic wavelength of 0.53 micron meter.

In order to carry out such wavelength conversion, the nonlinear optical crystal is combined in the solid-state laser device with a resonator and an excitor for supplying an excitation beam to the nonlinear optical crystal. In the solid-state laser device, the resonator comprises an output mirror and a reflection mirror so as to provide an outer resonator for the primary laser beam of the fundamental wavelength. Both of the output mirror and the reflection mirror are opposed to both ends of the nonlinear optical crystal with spacings left therebetween, respectively. In addition, the excitor is formed by a dye laser directed to a side surface of the nonlinear optical crystal with a distance left between the side surface and the dye laser.

In the solid-state laser device, each of the output mirror and the reflection mirror has an optical characteristic such that about 100% of the primary laser beam is reflected. In addition, the reflection mirror reflects about 100% of the subsidiary laser beam while the output mirror transmits 80% of the subsidiary laser beam.

Under the circumstances, when the excitation beam is supplied from the dye laser to the side surface of the solid-state laser medium, a resonance path for the primary laser beam of the fundamental wavelength is formed between the output mirror and the reflection mirror. Subsequently, the primary laser beam is partially converted in wavelength into the subsidiary laser beam within the resonance path. As a result, the subsidiary laser beam is transmitted through the output mirror as an output laser beam.

However, the above-mentioned solid-state laser device is disadvantageous in that it is bulky in size and has a short life time because the dye laser is used as the excitor. Furthermore, since a dye should be exchanged from time to time, a lot of labor is necessary for maintenance of the solid-state laser device.

In addition, the resonator is formed by the output mirror and the reflection mirror both of which are distant from the solid-state laser medium. Such a resonator is large in size and therefore results in an increase in size in the solid-state laser device. Moreover, the primary laser beam is objectionably weak in strength because a loss inevitably takes place while the primary laser beam is propagated within a space between the output mirror and the reflection mirror. This results in a reduction of conversion efficiency between the primary and the subsidiary laser beams.

SUMMARY OF THE INVENTION

It is an object of this invention to provide a solid-state laser device which is small in size.

It is another object of this invention to provide a solid-state laser device of the type described, which has an excellent conversion efficiency on converting a primary laser beam of a fundamental wavelength into a subsidiary laser beam of a harmonic wavelength.

According to this invention, a solid-state laser device comprises a semiconductor laser element for generating an excitation beam, a solid-state laser medium which is composed of a nonlinear optical crystal including a laser activator and which has a pair of ends opposed to each other and directed towards the semiconductor laser element. The solid-state laser medium generates a primary laser beam of a fundamental wavelength and a subsidiary laser beam of a harmonic wavelength which is different from that of the primary laser beam when the laser activator is excited by the excitation beam. The solid-state laser device further comprises a pair of optical elements which are brought into contact with the end surfaces and which have a primary optical characteristic such that the optical elements are operable as a resonator in response to the primary laser beam. At least one of the optical elements further has a subsidiary optical characteristic which allows the subsidiary laser beam to pass therethrough.

DESCRIPTION OF THE PREFERRED EMBODIMENT

Figure 1:
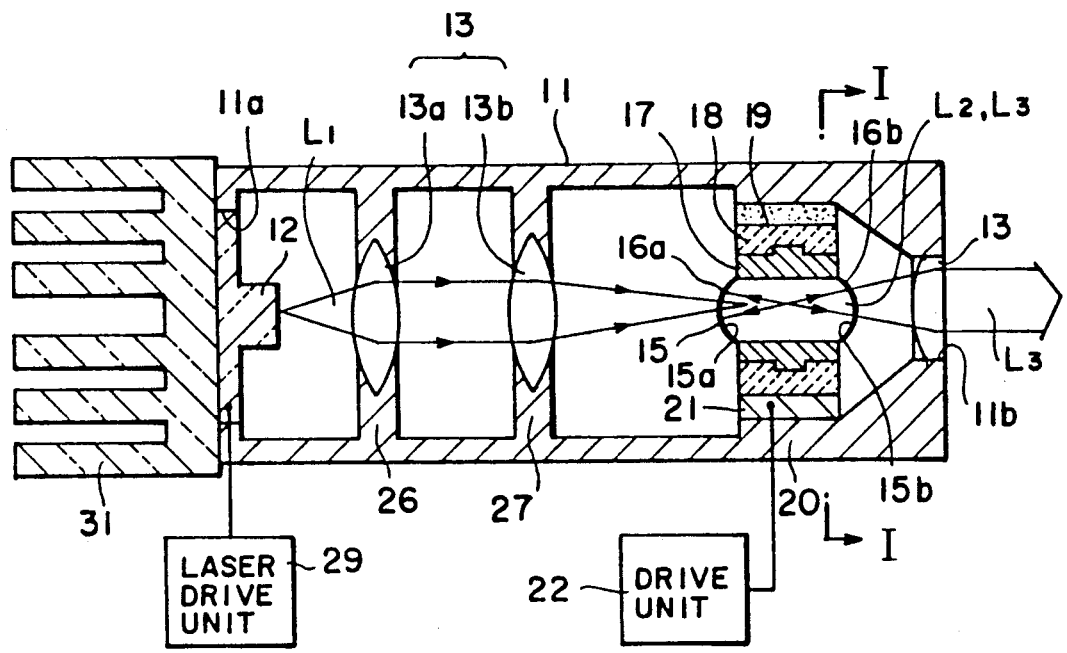
FIG. 1 is a cross sectional view of a solid-state laser device according to a preferred embodiment of the invention.
Figure 2:
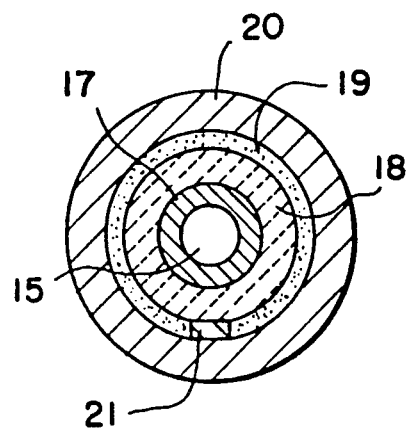
FIG. 2 is a sectional view taken along a line I—I illustrated in FIG. 1.

Referring to FIGS. 1 and 2, a solid-state laser device according to a preferred embodiment of this invention comprises a housing 11 which has a substantially cylindrical configuration, as illustrated in FIG. 2, and which has first and second housing ends located at lefthand and righthand sides of FIG. 1, respectively, and an inner space. The first and the second housing ends are open to define first and second windows 11a and 11b, respectively, as shown in FIG. 1. The inner space of the housing 11 is partitioned into first through fourth rooms numbered from the lefthand side of FIG. 1 to the righthand side, as will become clear as the description proceeds. A semiconductor laser device 12 is mounted in the first window 11a while a collimator lens 13 is fitted into the second window 11b.

The semiconductor laser device 12 is operable as an excitor or an excitation optical source to generate an excitation beam L1. The semiconductor laser device 12 generates, as the excitation beam L1, a laser beam having a wavelength of, for example, 805 nm and may be formed by a semiconductor laser medium which comprises gallium, aluminum, and arsenide and which has a maximum output of 500 milliwatts. The excitation beam L1 is sent along a traveling path through an optical system which is composed of first and second convex lenses 13a and 13b and which serves to collect the excitation beam L1 onto the solid-state laser medium 15. At any rate, the excitation beam L1 is collected or gathered into the solid-state laser medium 15.

The illustrated solid-state laser medium 15 comprises a nonlinear optical crystal having a composition represented by the chemical formula $Nd_xY_{1-x}Al_3(BO_3)_4$ and therefore includes Nd acting as a laser activator. As a result, the solid-state laser medium 15 is operable as a laser medium and practically can generate a primary laser beam of a fundamental wavelength of 1.062 micron meters. The solid-state laser medium 15 has a nonlinear constant d of, for example, $4.0 \times 10^{-9}$ esu. The nonlinear optical crystal is of cylindrical shape and therefore has a size specified by a diameter and a length equal, for example, to 3 millimeters and 5 millimeters, respectively. In addition, the nonlinear optical crystal has first and second ends 15a and 15b which are directed to the semiconductor laser device 12 and the second window 11b, respectively, and which have spherical surfaces convex outwards of the nonlinear optical crystal, as shown in FIG. 1. The first and the second ends 15a and 15b are opposed to each other and contiguous to a cylindrical side surface. Each of the illustrated spherical surfaces has a radius of curvature equal to 5 millimeters.

On the first and the second ends 15a and 15b, first and second optical thin films 16a and 16b are coated, as illustrated by thick lines in FIG. 1, as optical elements which serve as a resonator for the primary laser beam of the fundamental wavelength. Each of the first and the second thin films 16a and 16b has a primary optical characteristic such that about 100% of the fundamental wavelength is reflected by the first and the second thin films 16a and 16b. In addition, the first thin film 16a further exhibits a subsidiary optical characteristic such that the first thin film 16a reflects about 100% of a subsidiary laser beam L3 of a second harmonic wavelength which is equal to 0.531 micron meter and which results from wavelength conversion, as will become clear later. Moreover, the first thin film 16a transmits about 100% of the excitation beam sent from the semicondutor laser device 12. On the other hand, the second thin film 16b has an additional optical characteristic such that the second thin film 16b transmits about 80% of the subsidiary laser beam of the second harmonic wavelength. For this purpose, each of the first and the second thin films 16a and 16b is constituted as a multilayer film composed of a plurality of $TiO_2$ and $SiO_2$ films. In this event, it is needless to say that the first thin film 16a comprises the $TiO_2$ and the $SiO_2$ films different in number from those of the second thin film 16b. In any event, it is to be noted that the first and the second thin films 16a and 16b are brought into contact with the first and the second ends 15a and 15b of the solid-state laser medium 15 without any gap between the first thin film 16a and the first end 15a and between the second thin film 16b and the second end 15b.

The solid-state laser medium 15 is located between the third and the fourth rooms of the inner space of the housing 11 so that an optical axis is coincident with a center axis of the cylindrical solid-state laser medium 15, as illustrated in FIG. 1.

In FIG. 2, the solid-state laser medium 15 is fixed to an inside surface of a movable holder 17 of a substantially cylindrical configuration by an adhesive (not shown). The movable holder 17 is supported on an inside surface of a fixed holder 18 of a substantially cylindrical configuration by a slip fit. The fixed holder 18 has a groove formed along an inside peripheral surface while the movable holder 17 has a flange projected outwards thereof. The flange of the movable holder 17 is engaged in the groove of the fixed holder 18 so that the movable holder 17 is slidably rotatable within the fixed holder 18 while axial movement of the movable holder 17 is prevented. Thus, the movable holder 17 is rotatable relative to the fixed holder 18. With this structure, it is possible to adjust a crystal axis of the solid-state laser medium 15 to a predetermined angle in relation to a plane of polarization of the excitation beam L1 emitted from the semiconductor laser device 12. The fixed holder 18 is attached to an annular heat insulating material 19 which is partially cut away to provide a cut portion within the annular heat insulating material 19 and which is fastened to a support 20 fixed to an internal surface of the housing 11. A thermoelectric cooler or a Peltier effect element 21 is inserted within the cut portion of the annular heat insulating material 19 so as to keep the solid-state laser medium 15 at a predetermined temperature through the fixed holder 18 and the movable holder 17. The Peltier effect element 21 is connected to a drive unit 22 which is placed outside of the housing 11 and controlled by the drive unit 22 to be kept at the predetermined temperature.

As known in the art, the excitation beam L1 which has the wavelength of 805 nm is effectively absorbed by the solid-state laser medium 15 at a comparatively high rate and is high in quantum efficiency. Therefore, the solid-state laser medium 15 is excited at a high excitation efficiency when the excitation beam L1 of the above-mentioned wavelength is supplied to the solid-state laser medium 15.

When the semiconductor laser device 12 is driven by a laser drive unit 29 located outside of the housing 11, the excitation beam L1 is generated from the semiconductor laser device 12 and is passed through the first and the second convex lenses 13a and 13b both of which are operable as an excitation beam collection element collectively shown by 13. As a result, the excitation beam L1 is focused into the solid-state laser medium 15. More specifically, the excitation beam L1 is converted or collimated by the first convex lens 13a into a parallel beam which is thereafter focused by the second convex lens 13b onto the first end of the solid-state laser medium 15 along the optical axis. The first and the second convex lenses 13a and 13b are supported by first and second lens holders 26 and 27 projecting from an inside wall of the housing 11 inside the space of the housing 11.

On the lefthand side of the first housing end 11a, a radiator 31 is mounted to radiate heat accumulated in the semiconductor laser device 12. In order to effectively radiate heat, the radiator 31 has a plurality in fins extended leftwards of FIG. 1 and therefore has a comb shape in section, as illustrated in FIG. 1.

Now, the operation will be described with reference to FIG. 1 for a better understanding of this invention.

At first, the excitation beam L1 is focused onto the optical axis adjacent to the first end 15a of the solid-state laser medium 15 in the manner mentioned before, the excitation beam L1 enters the solid-state laser medium 15 through the first thin film 16a to form an internal path of the excitation beam L1. On the other hand, resonant optical paths for the primary laser beam L2 of the fundamental wavelength are also formed within the solid-state laser medium 15, as will be mentioned later. The internal path of the excitation beam L1 is selected so that it is included in the resonant optical paths.

When the solid-state laser medium 15 is excited by the excitation beam L1 at a high excitation efficiency, the primary laser beam L2 is generated due to the presence of the laser activator, namely, Nd and forms the resonant optical paths between the first and the second thin films 16a and 16b because both the thin films 16a and 16b reflect about 100% of the primary laser beam L2, as mentioned before. From this fact, it is readily understood that the first and the second thin films 16a and 16b are operable as the resonator attached to the solid-state laser medium 15 without any gap. As a result, the primary laser beam L2 is substantially confined within the solid-state laser medium 15.

More particularly, attention is directed to the fact that the spherical surfaces are formed on the first and the second ends 15a and 15b of the solid-state laser medium 15 and have convex configurations directed outwards of the solid-state laser medium 15. Therefore, the resonant optical paths of the primary laser beam L2 are reflected by each of the first and the second thin films 16a and 16b in the direction of the center of the solid-state laser medium 15 even when the primary laser beam L2 is reflected at a portion spaced apart from the optical axis, as shown in FIG. 1. Consequently, the primary laser beam L2 forms a beam node at a center position along the optical axis within the solid-state laser medium 15.

With this structure, the primary laser beam L2 is partially converted in wavelength into the subsidiary laser beam L3 of the second harmonic wavelength at the resonant optical paths within the solid-state laser medium 15. The subsidiary laser beam L3 travels along the traveling direction of the primary laser beam L2 and reaches the second thin film 16b which transmits the subsidiary laser beam L3, as mentioned before. On the other hand, the subsidiary laser beam L3 is completely reflected by the first thin film 16a. Under the circumstances, the subsidiary laser beam L3 is transmitted through the second thin film 16b. The subsidiary laser beam L3 appears as a divergent light beam because the subsidiary laser beam L3 is produced along the resonant optical paths of the primary laser beam. The divergent light beam L3 is collimated into a parallel laser beam by the collimator lens 13 mounted on the second window 11b. Thereafter, the parallel laser beam is produced as an output laser beam depicted at L3 in FIG. 1.

Practically, the excitation beam L1 of 450 milliwatts is supplied from the semiconductor laser device 12 to the solid-state laser medium 15. In this case, the subsidiary laser beam L3 of the second harmonic wavelength has a power of 20 milliwatts.

As mentioned before, the first and the second thin films 16a and 16b are coated as the optical elements on the first and the second ends 15a and 15b of the solid-state laser medium 15 so as to form the resonator for the primary laser beam L2. In other words, no gap is left between the resonator and the solid-state laser medium 15. Hence, no loss takes place within the resonator. Accordingly, it is possible with this solid-state laser device to suppress that reduction of light which might result from the loss occurring within the resonator. Therefore, the semiconductor laser device 12 which produces a laser beam of comparatively small power can be used as the excitation optical source for exciting the solid-state laser medium 15. This makes it possible to reduce the size of the solid-state laser device.

In addition, inasmuch as the quantity of the primary laser beam L2 is not reduced within the resonator, it is also possible to suppress reduction of the subsidiary laser beam L3 obtained by wavelength conversion. This means that the primary laser beam L2 is effectively converted in wavelength into the subsidiary laser beam L3 without any loss accompanied by the wavelength conversion. Moreover, the primary laser beam L2 of the fundamental wavelength passes through the resonant optical paths only within the solid-state laser medium 15 interposed between the first and the second thin films 16a and 16b. Accordingly, a high wavelength conversion is accomplished with the solid-state laser device illustrated in FIG. 1.

Inasmuch as the spherical convex surfaces are formed on the first and the second ends of the solid-state laser medium 15 to be covered with the first and the second thin films 16a and 16b, respectively, the beam node of the resonant optical paths for the primary laser beam L2 appears at the center portion of the solid-state laser medium 15. This means that the primary laser beam L2 has high power density. Accordingly, the conversion efficiency from the excitation beam to the subsidiary beam is 4% which is much higher than that of the conventional solid-state laser device mentioned in the background section of the instant specification.

The illustrated solid-state laser device is kept at a constant temperature by the use of the Peltier effect element and the radiator 31. Therefore, the distance or length between the first and the second thin films 16a and 16b is substantially kept invariable, which enables stable oscillation of the primary laser beam L2. Additionally, the temperature of the solid-state laser medium 15 is always kept substantially constant to satisfy the phase match condition of the wavelength conversion from the primary laser beam L2 to the subsidiary laser beam L3. Accordingly, it is possible to stably carry out the wavelength conversion between the primary and the subsidiary laser beams L2 and L3 in the solid-state laser device. Practically, an output variation of the subsidiary laser beam L3 can be kept within a range of 1%.

While this invention has thus far been described in conjunction with a preferred embodiment thereof, it will readily be possible for those skilled in the art to put this invention into practice in various other manners. For example, the solid-state laser medium 15 may be a nonlinear optical crystal of $Nd:MgO:LiNbO_3$ instead of $Nd_xY_{1-x}Al_3(BO_3)_4$. The laser activator may be selected from rare earth elements, such as Er. The optical elements for the resonator may be formed by mirrors which have reflection surfaces brought into contact with the first and the second ends of the solid-state laser medium 15. Moreover, a selected one of the optical elements, for example, the second thin film 16b, may not be always brought into contact with the solid-state laser medium 15. In this case, the selected optical element may be formed by a conventional mirror. In addition, at least one of the first and the second ends of the solid-state laser medium 15 has a spherical surface convex outwards of the medium so as to form a beam node for the primary laser beam within the medium.

The semiconductor laser device may be selected in consideration of an absorption band of laser activators included in the solid-state laser medium 15 and may generate an excitation beam having a wavelength adjusted to the absorption band. For example, when excitation is made about a nonlinear optical crystal including Er, a semiconductor laser device may be selected which generates the excitation beam including a wavelength of 797 nm. It has been confirmed that the primary laser beam is stably generated even when a semiconductor laser device has minimum output power, such as 30 milliwatts. Furthermore, the solid-state laser medium 15 may be excited from the cylindrical side surface thereof, in lieu of excitation of the solid-state laser medium 15 from the end surface.

The optical system, such as the first and the second convex lenses 13a and 13b, may be replaced by a beam shaper (for example, prism pair optics) for shaping a section of a beam, a dioptic lens, GRIN lens, or the like. Alternatively, such an optical system may be, for example, an optical fiber, a bundle of optical fibers, or the like, each of which optically couples the semiconductor laser device to the solid-state laser medium.

As mentioned before, the solid-state laser device comprises a solid-state laser medium composed of a nonlinear optical crystal which includes a laser activator and which carries out wavelength conversion of a fundamental wavelength into a harmonic wavelength. A pair of optical elements are brought into contact with both ends of the nonlinear optical crystal so as to form a resonator for the fundamental wavelength. Such a contact between the solid-state laser medium and the resonator is capable of suppressing reduction of light resulting from loss within the resonator and can make the solid-state laser device small in size. In addition, it is possible to convert the fundamental wavelength into the harmonic wavelength at a high conversion efficiency, as described before.

What is claimed is:

1. A solid-state laser device comprising:

a semiconductor laser element for generating an excitation beam having a predetermined plane of polarization;

a solid-state laser medium which comprises a nonlinear optical crystal including a laser activator and which has a pair of end surfaces opposed to each other and a crystal axis extending through said end surfaces, said solid-state laser medium being directed towards said semiconductor laser element and generating a primary laser beam of a fundamental wavelength and a subsidiary laser beam of a harmonic wavelength different from that of said primary laser beam when said activator is excited by said excitation beam;

a pair of optical elements in direct contact with said end surfaces and which have a primary optical characteristic such that said optical elements are operable as a resonator in response to said primary laser beam, at least one of said optical elements further having a subsidiary optical characteristic which allows said subsidiary laser beam to pass therethrough; and a support for supporting said solid-state laser medium so that said crystal axis of the solid-state laser medium is adjustable to said predetermined plane of polarization.

2. A solid-state laser device as claimed in claim 1, wherein said optical elements comprise optical thin films.

3. A solid-state laser device as claimed in claim 1, wherein said nonlinear laser crystal comprises $Nd_xY_{1-x}Al_3(BO_3)_4$ where x is not greater than 0.2.

4. A solid-state laser device as claimed in claim 1, wherein said end surfaces of the solid-state laser medium form spherical surfaces which are convex outwards of said solid-state laser medium.

5. A solid-state laser device as claimed in claim 4, wherein said spherical end surfaces of said solid-state laser medium are positioned to form a node for said primary laser beam at a center position of said laser medium between said end surfaces.

6. A solid-state laser device as claimed in claim 1, wherein said support includes means for engaging said solid-state laser medium to rotate the same while holding said laser medium in an axially fixed position.

7. A solid-state laser device as claimed in claim 6, wherein said spherical end surfaces are concentrically aligned on said crystal axis.

8. A solid-state laser device as claimed in claim 7, wherein said means for rotating said solid-state laser medium includes means to rotate said laser medium around said crystal axis.

* * * * *